Figures 1, 2:
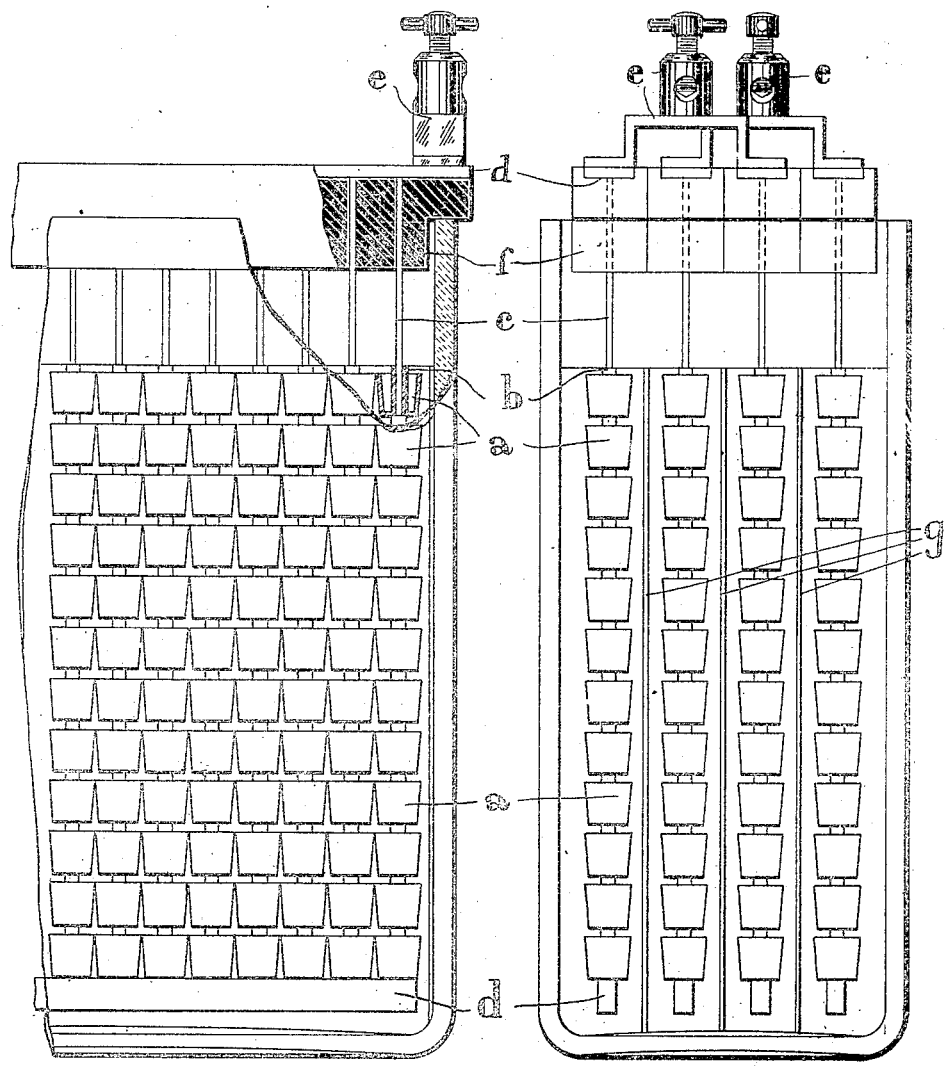

W. MOSELEY.
SECONDARY ELECTRIC BATTERY OR ACCUMULATOR.
APPLICATION FILED MAR. 29, 1909.

930,213.

Patented Aug. 3, 1909.

WITNESSES

INVENTOR
Walker Moseley

UNITED STATES PATENT OFFICE.

WALKER MOSELEY, OF LONDON, ENGLAND.

SECONDARY ELECTRIC BATTERY OR ACCUMULATOR.

No. 930,213.  Specification of Letters Patent.  Patented Aug. 3, 1909.

Application filed March 29, 1909. Serial No. 486,500.

*To all whom it may concern:*

Be it known that I, WALKER MOSELEY, subject of the King of Great Britain and Ireland, residing at London, England, have invented new and useful Improvements in Secondary Electric Batteries or Accumulators, of which the following is a specification.

This invention relates to secondary electric batteries or accumulators and has for its object the provision of means whereby the plates carrying the active material are so constructed as to avoid the risk of buckling or ejection of the material, the running cost of the maintenance is very low, and the weight of each plate is reduced compared with known plates of equal output.

My invention consists of forming the plate of a series of suitable cups of tea or coffee cup or wine glass shape, each provided with a perforated stem so that each cup is supported one above the other on said stem by being threaded on a wire or similar support and adapted to hold the active material in a lightly consolidated mass under the influence of gravity only, and capable of ready action under the influence of the electrolyte which permeates the body of the active material with a greater facility than in other known forms of plates. In most existing types the law of osmosis which is based on capillary attraction prevents the diffusion of the acid through the porous material.

In order that my invention may be the better understood I will now proceed to describe the same in relation to the accompanying drawings reference being had to the letters and figures marked thereon.

Like letters refer to like parts in the various figures.

Figure 1 is a part sectional side view of a cell fitted according to my invention, and Fig. 2 is an end view of Fig. 1.

I form each cup $a$ having a small perforated stem $b$ extending upwardly from the bottom of the cup to a point a little higher than the rim of the cup, and I thread these cups one above the other upon lead or lead covered wires $c$ supported in a frame of lead $d$, in which the lead covered wires are connected to the upper and lower frames $d$ by soldering or by otherwise jointing them thereto. The upper of these frames rests upon frames $f$ of vulcanite or other insulating material, so as to bed upon the outer casing. The electrode is thus formed out of the cups $a$ with their filling, the internal lead or lead covered wires $c$, and the top and bottom pieces of lead $d$, connecting these wires $c$. These upper frames $d$ are provided with the usual connecting and terminal fittings $e$. By stamping up the cups in this way, they can be made very thin indeed and the stem of the cup forms the means of support. When the cups have all been threaded on to the wire the stems are pinched circumferentially so as to grip the same and give a good contact or equivalently the stems and the supporting wires are fused together.

In order to furnish the plates made according to my invention with oxid of lead I form a very liquid paste of about the consistency of cream, and I pour the paste into the cups $a$ or I dip the plates into it, so that the cups are filled with the oxid by natural settlement of the solid particles and not by packing or hydraulic pressure. This method of filling the cups by gravitation improves the molecular state of the active material on which the capacity of the cell depends, and further the necessity of handling lead oxid with its consequent detrimental effect on the workmen is entirely avoided. The positive and negative electrodes are divided by transverse perforated sheets $g$ as shown in Fig. 2.

Having now particularly described and ascertained the nature of this invention and in what manner the same is to be performed, I declare that what I claim is:—

An accumulator plate consisting of a series of conical cups, adapted to receive and hold a semiliquid solution of oxid of lead, each cup being provided with a perforated stem, the said stem being made a little higher than the rim of the cup, vertical rods of lead upon which the said cups are threaded, lower and upper bars of lead to which the said rods are fixed, and cross bars of vulcanite for supporting the upper bars.

In testimony whereof I have signed my name to this specification in the presence of two subscribing witnesses.

WALKER MOSELEY.

Witnesses:
 LILIAN MARIA MOSELEY,
 GRACE ROSALIND KEMP.